(12) United States Patent
Møller

(10) Patent No.: US 12,529,862 B2
(45) Date of Patent: Jan. 20, 2026

(54) APPARATUS FOR INSTALLING A CABLE INTO A CONDUIT

(71) Applicant: FREMCO A/S, Frederikshavn (DK)

(72) Inventor: Hans Jacob Møller, Aalborg (DK)

(73) Assignee: FREMCO A/S, Frederikshavn (DK)

( * ) Notice: Subject to any disclaimer, the term of this patent is extended or adjusted under 35 U.S.C. 154(b) by 321 days.

(21) Appl. No.: 18/257,954

(22) PCT Filed: Dec. 13, 2021

(86) PCT No.: PCT/EP2021/085436
§ 371 (c)(1),
(2) Date: Jun. 16, 2023

(87) PCT Pub. No.: WO2022/128888
PCT Pub. Date: Jun. 23, 2022

(65) Prior Publication Data
US 2024/0210649 A1    Jun. 27, 2024

(30) Foreign Application Priority Data

Dec. 17, 2020 (DK) .............................. PA202070844

(51) Int. Cl.
*H02G 1/00* (2006.01)
*G02B 6/52* (2006.01)
*G02B 6/54* (2006.01)

(52) U.S. Cl.
CPC .................. *G02B 6/52* (2013.01); *G02B 6/54* (2013.01)

(58) Field of Classification Search
CPC ................................. H02G 1/00; H02G 1/086
See application file for complete search history.

(56) References Cited

U.S. PATENT DOCUMENTS 4,856,760 A    8/1989  Frost et al.
5,121,644 A    6/1992  Grey et al.
(Continued)

FOREIGN PATENT DOCUMENTS

EP    0 442 626 A2    8/1991
EP    0 253 636 B1    5/1993
(Continued)

OTHER PUBLICATIONS

Danish Office Action, dated Mar. 8, 2021, pp. 1-9, issued in Danish Patent Application No. PA 2020 70844, Danish Patent and Trademark Office, Taastrup, Denmark.
(Continued)

*Primary Examiner* — Lee D Wilson
(74) *Attorney, Agent, or Firm* — John C. Freeman; Crowell & Moring LLP

(57) ABSTRACT

An apparatus including a blowing chamber house having a cable inlet opening, a cable outlet opening, a fluid inlet opening for receiving a supply of pressurized fluid. A fluid flow control for controlling flow of pressurized fluid to the fluid inlet opening of the blowing chamber house. A pushing drive and a conveyor including conveyer parts arranged at opposing sides of a cable guidance space and configured to be driven by the pushing drive. The control is arranged to determine a measure of resistance to a cable being installed into the conduit by the conveyor and for controlling the operation of the apparatus in accordance with the determined measure of resistance. The control is arranged to control the fluid flow control to increase the flow of pressurized fluid into the blowing chamber house in response to an increase in the determined resistance.

15 Claims, 2 Drawing Sheets

(56) References Cited

U.S. PATENT DOCUMENTS

| | | | |
|---|---|---|---|
| 5,211,377 A | 5/1993 | Griffioen et al. | |
| 5,813,658 A | 9/1998 | Kaminski et al. | |
| 5,967,495 A * | 10/1999 | Kaminski | G02B 6/50 |
| | | | 254/134.4 |
| 6,019,351 A * | 2/2000 | Allen | G02B 6/52 |
| | | | 254/134.3 R |
| 6,059,264 A | 5/2000 | Kaminski et al. | |
| 6,364,290 B1 | 4/2002 | Barker | |
| 6,402,123 B1 * | 6/2002 | Rivard | G02B 6/52 |
| | | | 254/134.4 |
| 6,540,208 B1 * | 4/2003 | Pecot | G02B 6/52 |
| | | | 254/134.3 R |
| 8,550,435 B2 | 10/2013 | Gonen et al. | |
| 8,720,030 B2 * | 5/2014 | Barker | G02B 6/52 |
| | | | 29/709 |
| 10,177,546 B2 * | 1/2019 | Allen | H01B 17/00 |
| 11,196,237 B2 * | 12/2021 | Griffioen | H02G 1/086 |
| 11,237,350 B2 | 2/2022 | Wacinski | |
| 2006/0219992 A1 | 10/2006 | Fee et al. | |
| 2009/0065753 A1 | 3/2009 | Gonen et al. | |
| 2010/0046895 A1 | 2/2010 | Barker et al. | |
| 2012/0023723 A1 | 2/2012 | Barker et al. | |
| 2019/0341752 A1 | 11/2019 | Radichel et al. | |
| 2020/0150375 A1 | 5/2020 | Wacinski | |

FOREIGN PATENT DOCUMENTS

| | | | |
|---|---|---|---|
| EP | 2 415 135 B1 | 8/2014 | |
| WO | WO 98/12588 A1 | 3/1998 | |
| WO | WO 2006/103424 A1 | 10/2006 | |
| WO | WO 2008/119976 A1 | 10/2008 | |
| WO | WO 2018/141925 A1 | 8/2018 | |
| WO | WO 2020/076169 A1 | 4/2020 | |
| WO | WO-2022128888 A1 * | 6/2022 | G02B 6/54 |
| WO | WO-2022128891 A1 * | 6/2022 | G02B 6/54 |
| WO | WO-2022128894 A1 * | 6/2022 | G02B 6/54 |

OTHER PUBLICATIONS

International Search Report dated Apr. 7, 2022, (3 pages), out of PCT Priority Application No. PCT/EP2021/085436.

Written Opinion dated Apr. 7, 2022, (5 pages), out of PCT Priority Application No. PCT/EP2021/085436.

International Preliminary Report on Patentability dated Jun. 13, 2023 (6 pages) out of PCT Priority Application No. PCT/EP2021/085436.

* cited by examiner

APPARATUS FOR INSTALLING A CABLE INTO A CONDUIT

This application is a National Stage application of International Application No. PCT/EP2021/085436, filed Dec. 13, 2021, the entire contents of which are incorporated herein by reference.

This application claims priority under 35 U.S.C. § 119 (a) to Danish Patent Application No. 2020 70844, filed on Dec. 17, 2020, the entire contents of each of which are incorporated herein by reference.

BACKGROUND OF THE INVENTION

Field of the Invention

The present invention relates to an apparatus for installing a cable into a conduit, in particular an optical fiber cable, by means of a conveyor arrangement for feeding the cable into the conduit as well as a flow of pressurized fluid inside the conduit to provide a drag to the cable therein.

Description of the Related Art

Apparatus of installing cables, such as optical fibre cables into conduits by applying a fluid flow in the conduit and use the drag force from the fluid on the cable to advance the cable further into the conduit is well known, also in combination with a conveyor arrangement for feeding the cable into the conduit. A well-known problem is to control the apparatus efficiently, in particular to avoid or resolve problems of the cable buckling or curling up inside the conduit instead of being advanced towards the distal end of the conduit. Various solutions are suggested in WO 2008/119976 A1, WO 2006/103424 A1, EP 253636 A1, and WO 98/12588 A1 and in EP 2415135, wherein different ways of detecting such problems and control the apparatus are disclosed.

An aim of the present invention is to provide an apparatus, which is improved with respect to surveilling the operation of the apparatus. It is a further aim to provide improved control of the apparatus for resolving such problems related to buckling or curling of the cable.

SUMMARY OF THE INVENTION

The present invention relates to an apparatus for installing a cable, such as an optical fibre cable, into a conduit, with the assistance of a fluid drag, such as by means of a gas, on the cable within the conduit, the apparatus including:
- a blowing chamber house including a cable inlet opening and a cable outlet opening and a fluid inlet opening for receiving a supply of pressurized fluid, wherein the cable outlet opening is configured to be connected to the conduit and allow supplied pressurized fluid to flow into the conduit,
- a fluid flow control unit for controlling flow of pressurized fluid to the fluid inlet opening of the blowing chamber house,
- a pushing drive unit,
- a conveyor arrangement including a first conveyer part and a second conveyer part, wherein the conveyer parts are arranged at opposing sides of a cable guidance space and wherein one or both conveyer parts are configured to be driven by the pushing drive unit of the apparatus and thereby induce a driving force and a driving speed onto a part of the cable arranged in the cable guidance space, wherein the control means are arranged to determine a measure of resistance to the cable being installed into the conduit by means of the conveyor arrangement and for controlling the operation of the apparatus in accordance with the said determined measure of resistance, wherein the control means are arranged to control the fluid flow control unit in response to the said determined resistance and/or to control the pushing drive unit in response to the said determined resistance, wherein the control means are arranged to control the fluid flow control unit to increase the flow of pressurized fluid into the blowing chamber house in response to an increase in the said determined resistance.

The driving force $F_{dr}$ induced on the cable by the conveyor arrangement may in some embodiments be equal to the pushing force $F_p$ on the cable in the conduit. However, in other embodiments, the conveyor arrangement also provides a force to unwind the cable from a cable reel or cable drum, so that the driving force is a sum of the force needed to unwind the cable and the pushing force $F_p$.

The pressurized fluid is preferably a gas, in particular atmospheric air, but may in some embodiments be water. One known measure of the resistance is the pushing force with which the pushing drive unit by means of the conveyor arrangement feeds the cable into the conduit, e.g. measured as the power consumed by the pushing drive unit, possibly adjusted for the power used to unwind the cable from a cable reel or cable drum. Yet another known measure of the resistance is using a buckle sensor, which is e.g. described in international patent application WO 2008/119976 A1, where the cable bend of a free hanging part of the cable between the conveyor arrangement and the conduit is determined as a measure of the tendency of the cable to buckle inside the conduit and thus as a measure of the resistance on the movement of the cable inside the conduit. Other means of detecting a measure of the tendency of the cable to buckle are disclosed in WO 2006/103424 A1, EP 253636 A1 and in WO 98/12588 A1. A determination of the magnitude of a slip between the cable and driving surfaces of the first and the second conveyor parts, i.e. that the actual speed of the cable is lower than the driving speed of the driving surfaces, which is well known to determine and is disclosed e.g. in EP 2415135 may also constitute a known measure of resistance to the cable.

The conveyor arrangement and the blowing chamber house are preferably arranged to be mutually displaceable, wherein the apparatus includes a force sensor arranged to measure a force between the blowing chamber house and the conveyor arrangement and provide a sensor output accordingly to the control means, which is arranged to apply the sensor output to determine the measure of resistance to the cable being installed into the conduit by means of the conveyor arrangement.

The force sensor arrangement, such as a load cell, measures the force between the blowing chamber house, which is connected to the conduit, and the conveyor arrangement. The conveyor arrangement and the blowing house are arranged to mutually displaceable, so that the force sensor is able to measure a force between the two. In one embodiment, the conveyor arrangement is arranged displaceably with respect to the blowing chamber house, in another the blowing chamber house is arranged displaceably with respect to the conveyor arrangement, and the blowing chamber house as well as the conveyor arrangement are both displaceably arranged.

The force sensor arrangement is positioned to be able to measure the between the blowing chamber house and the conveyor arrangement, either directly between the two or indirectly by being positioned to measure the force between a displaceably arranged conveyor arrangement and a frame part of the apparatus to which the blowing chamber house is rigidly connected or in an alternatively arrangement between a displaceably arranged blowing chamber house and a frame part of the apparatus to which the conveyor arrangement is rigidly connected.

In a preferred embodiment, the blowing chamber house is displaceably arranged whereas the conveyor arrangement is rigidly connected to a frame part of the apparatus and the force sensor arrangement is positioned to measure the force between the blowing chamber house and the conveyor arrangement or the frame part of the apparatus, since the sensor output in this embodiment is independent of any possible force provided by the conveyor arrangement to unwind the cable from a cable reel or cable drum.

In operation of the apparatus, the cable in the conduit is subject to a pushing force Fp from the conveyor arrangement, a drag force Fd from the fluid flow inside the conduit, and a friction force Ff from the friction between the inner wall of the conduit and the cable. The vector sum of these three forces is substantially zero, as the cable can be assumed not to accelerate substantially during operation of the apparatus. The force sensor measures the force acting on the conveyor arrangement, which substantially is equal to the pushing force Fp necessary to overcome the resistance to the cable being fed into the conduit, which is the difference between the drag force Fd acting in the same direction as the pushing force Fp, and the friction force Ff acting in a direction opposite of the two other forces.

The force sensor provides a very precise measure of the magnitude of the resistance to the cable being fed into the conduit, which is counteracted by the pushing force Fp as opposed to the known indirect means of providing a measure of the resistance.

However, by providing a force sensor between the blowing chamber house and the conveyor arrangement, a very precise measure of the resistance may be obtained in accordance with the present invention, which enables a fast and reliable parameter for allowing the control means to control the operation of the apparatus in response to the output from the force sensor.

An increase in the determined resistance, such as the measured force while the flow of pressurized fluid is unaltered is an indication that the friction force Ff on the cable in the conduit has increased, which means that the contact between the cable in the conduit and the inner walls of the conduit has increased. This can be due to different circumstances, including that the tip of the cable is advancing slower than the driving speed of the cable, causing the cable to buckle within the conduit and have an increased contact friction with the interior wall of the conduit. Other causes of increase of the measured force can be irregularities, joints or bends of the conduit. Generally, the friction force and thus the determined resistance will increase gradually during the installation of a cable in a conduit as the length of the cable inside the conduit increases.

By changing the flow of pressurized fluid into the blowing chamber house, the fluid flow and thereby the speed of the fluid inside the conduit is changed and so is the drag force on the cable inside the conduit. Thus, by increasing the flow, the drag force on the cable inside the conduit is increased. The control parameter to control the flow of pressurized fluid into the blowing chamber house may e.g. be a fluid velocity parameter in a defined flow channel or a fluid pressure parameter of a pressure of the pressurized fluid measured e.g. in the blowing chamber house or in a flow channel conducting the flow of pressurized fluid into the blowing chamber house.

By controlling the pushing drive unit, the control means are arranged to control the driving speed of the cable into the conduit, whereby the magnitude of the friction force Ff between the cable in the conduit and the inner wall of the conduit may be controlled as well as the possible buckling of the cable can be controlled.

In a preferred embodiment of the invention, the apparatus further includes a flow measurement sensor arranged to measure the flow of the pressurized fluid into the blowing chamber house and providing a flow measurement output accordingly to the control means, and wherein the control means are arranged to control the fluid flow control unit in response to the flow measurement output.

The flow measurement sensor may be an anemometer of a known type, such as one comprise a rotating vane or a rotor including cups, i.e., a cup anemometer, a hot-wire anemometer or other cooling-based anemometers, an ultra-sonic anemometer, or a pressure difference anemometer, such as a pitot-static tube, a Venturi tube or an orifice plate anemometer.

An increase of the flow of pressurized fluid will normally increase the drag force from the flowing fluid in the conduit on the cable and thus reduce the force measured by the force sensor. Such control of the fluid flow may be conducted gradually or stepwise by the control means of the apparatus, and the control means may be equipped to differentiate between gradually increase of the measured force as the cable is fed further into the conduit and a more rapid or sudden increase of the measured force caused by a curling or buckle of the cable in the conduit caused by a mismatch between the speed with which the tip of the cable is advancing inside the conduit and the driving speed with which the cable is fed into the conduit by the conveyor arrangement.

In particular, the control means may be arranged to control the fluid flow control unit to increase the flow of pressurized fluid into the blowing chamber house in case the determined resistance exceeds a determined value, such as when the measured force between the blowing chamber house and the conveyor arrangement determined from the sensor output provided by the force sensor exceeds a determined value.

The determined value may e.g. be found as a given percentage of a push force set point value, such as 10% or more of the push force set point value, preferably such as 20%.

The control means may furthermore be arranged to control the pushing drive unit in response to the determined resistance, such as the sensor output provided by the force sensor, to reduce the driving speed induced onto the cable in response to an increase in the determined resistance, such as the force between the blowing chamber house and the conveyor arrangement.

By reducing the driving speed of the cable, the friction force Ff between the cable in the conduit and the inner wall of the conduit is reduced, which allows the drag force Fd of the fluid flow in the conduit to advance the tip of the cable with the same speed as the driving speed of the cable into the conduit, or if possible advance the tip of the cable faster than the driving speed to straighten out possible loops or curls of the buckling cable. The reduction of the driving speed is particularly useful in case the flow of the pressurized fluid into the blowing chamber house and thus into the conduit cannot be increased further, e.g. in operational situations where the cable has been fed far into the conduit and the flow of the pressurized fluid has been increased to its upper limit.

The control means may in particular be arranged to reduce the driving speed induced onto the cable with 50% to 90%, such as with 65% to 80% of the current driving speed of the cable, in response to said determined resistance, such as the output from the force sensor.

By reducing the driving speed of the cable, the friction force Ff between the cable in the conduit and the inner wall of the conduit is reduced, which allows the drag force Fd of the fluid flow in the conduit to straighten out possible loops or curls of the buckling cable. By avoiding to completely halt the advance of the cable into the conduit but retain from 10% to 50% of the driving speed of the cable prior to the reduction, such as from 35% to 20% thereof, it has shown to be easier to successfully straightening out the cable in the conduit, thereby lowering the resistance from the friction force Ff and resume the conveyance of the cable into the conduit.

In accordance with one embodiment, the control means are arranged to make the reduction when the determined resistance exceeds a threshold value, such as when the output from the force sensor exceeds a threshold value.

In accordance with another embodiment, the control means are arranged to make the reduction when a rate of change of the determined resistance exceeds a threshold value, such as when the output from the force sensor exceeds a threshold value.

A high rate of chance of the determined resistance, such as the force between the blowing chamber house and the conveyor arrangement, may be indicative of buckling of the cable in the conduit Furthermore, the control means may be arranged to control the pushing drive unit to terminate the driving of the cable by means of the conveyor arrangement in response to the determined resistance indicating an increase in the resistance to the cable being installed into the conduit by means of the conveyor arrangement, such as the sensor output provided by the force sensor indicating an increase in the force between the blowing chamber house and the conveyor arrangement.

By terminating or halting the driving of the cable into the conduit, the drag force from the fluid flowing in the conduit on the cable inside the conduit is allowed to straighten out possible loops of the cable inside the conduit, which are assumed to be the cause of the high output from the force sensor.

The control means may furthermore be arranged to control the pushing drive unit to reverse the driving speed of the cable by means of the conveyor arrangement in response to the determined resistance indicating an increase in the resistance to the cable being installed into the conduit by means of the conveyor arrangement, such as in response to the sensor output provided by the force sensor indicating an increase in the force between the blowing chamber house and the conveyor arrangement.

By reversing the driving speed of the cable, possible curls or loops of the cable inside the conduit may be straighten out.

According to a particular aspect, the present invention relates to an apparatus for installing a cable, such as an optical fiber cable, into a conduit, with the assistance of a fluid drag, such as by means of a gas, on the cable within the conduit, the apparatus including:
- a blowing chamber house including a cable inlet opening and a cable outlet opening and a fluid inlet opening for receiving a supply of pressurized fluid, wherein the cable outlet opening is configured to be connected to the conduit and allow supplied pressurized fluid to flow into the conduit,
- a fluid flow control unit for controlling flow of pressurized fluid to the fluid inlet opening of the blowing chamber house,
- a pushing drive unit,
- a conveyor arrangement including a first conveyer part and a second conveyer part, wherein the conveyer parts are arranged at opposing sides of a cable guidance space and wherein one or both conveyer parts are configured to be driven by the pushing drive unit of the apparatus and thereby induce a pushing force and a driving speed onto a part of the cable arranged in the cable guidance space, and
- control means for controlling the operation of the apparatus, wherein the control means are arranged to determine a measure of resistance to the cable being installed into the conduit by means of the conveyor arrangement, wherein the control means are arranged control the pushing drive unit to reduce the driving speed induced onto the cable with 50% to 90%, such as with 65% to 80% of the current driving speed of the cable, in response to the determined measure of resistance.

The resistance to the cable being installed into the conduit stems mainly from the friction force Ff between the cable in the conduit and the inner wall of the conduit, which is counteracted, by the drag force Fd induced on the cable by the fluid flow inside the conduit. A measure of the resistance can be a force measurement between the blowing chamber house and the conveyor arrangement, provided that the conveyor arrangement is arranged displaceable with respect to the blowing chamber house. Another measure of the resistance can be the pushing force with which the pushing drive unit by means of the conveyor arrangement feeds the cable into the conduit, e.g. measured as the power consumed by the pushing drive unit, possibly adjusted for the power used to unwind the cable from a cable reel or cable drum. Yet another measure can be made using a buckle sensor, which is e.g. described in international patent application WO 2008/119976 A1, where the cable bend of a free hanging part of the cable between the conveyor arrangement and the conduit is determined as a measure of the tendency of the cable to buckle inside the conduit and thus as a measure of the resistance on the movement of the cable inside the conduit. Other means of detecting a measure of the tendency of the cable to buckle are disclosed in WO 2006/103424 A1, EP 253636 A1 and in WO 98/12588 A1. A determination of the magnitude of a slip between the cable and driving surfaces of the first and the second conveyor parts, i.e. that the actual speed of the cable is lower than the driving speed of the driving surfaces, which is well known to determine and is disclosed e.g. in EP 2415135 may also constitute a measure of resistance to the cable.

By reducing the driving speed of the cable with a substantial amount, the friction force Ff between the cable in the conduit and the inner wall of the conduit is reduced, which allows the drag force Fd of the fluid flow in the conduit to advance the tip of the cable with the same speed as the driving speed of the cable into the conduit, or if possible advance the tip of the cable faster than the driving speed to straighten out possible loops or curls of the buckling cable. The reduction of the driving speed is particularly useful in case the flow of the pressurized fluid into the blowing chamber house and thus into the conduit cannot be increased further, e.g. in operational situations where the cable has been fed far into the conduit and the flow of the pressurized fluid has been increased to its upper limit. By avoiding to completely halt the advance of the cable into the conduit but retain from 10% to 50% of the driving speed of the cable prior to the reduction, such as from 35% to 20% thereof, it has shown to be easier to successfully straightening out the cable in the conduit, thereby lowering the resistance from the friction force Ff and resume the conveyance of the cable into the conduit.

In accordance with one embodiment, the control means are arranged to make the reduction when the output from the force sensor exceeds a threshold value.

In accordance with another embodiment, the control means are arranged to make the reduction when a rate of change of the output from the force sensor exceeds a threshold value.

A high rate of chance of the force between the blowing chamber house and the conveyor arrangement may be indicative of buckling of the cable in the conduit Furthermore, the control means may be arranged to control the pushing drive unit to terminate the driving of the cable by means of the conveyor arrangement in response to the sensor output provided by the force sensor indicating an increase in the force between the blowing chamber house and the conveyor arrangement.

By terminating or halting the driving of the cable into the conduit, the drag force from the fluid flowing in the conduit on the cable inside the conduit is allowed to straighten out possible loops of the cable inside the conduit, which are assumed to be the cause of the high output from the force sensor.

The control means may furthermore be arranged to control the pushing drive unit to reverse the driving speed of the cable by means of the conveyor arrangement in response to the sensor output provided by the force sensor indicating an increase in the force between the blowing chamber house and the conveyor arrangement.

By reversing the driving speed of the cable, possible curls or loops of the cable inside the conduit may be straighten out.

BRIEF DESCRIPTION OF THE DRAWINGS

An embodiment of the present invention is illustrated in the accompanying drawings of which

DETAILED DESCRIPTION

Figure 1:
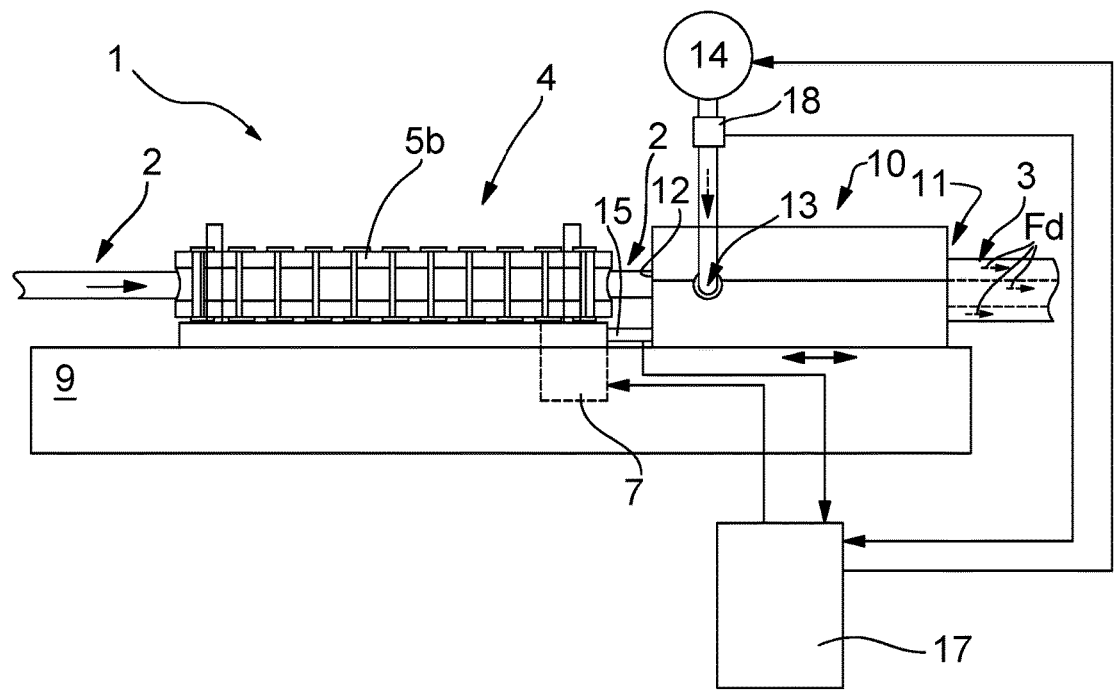
FIG. 1 is a side view of an embodiment of an apparatus according to the present invention.
Figure 2:
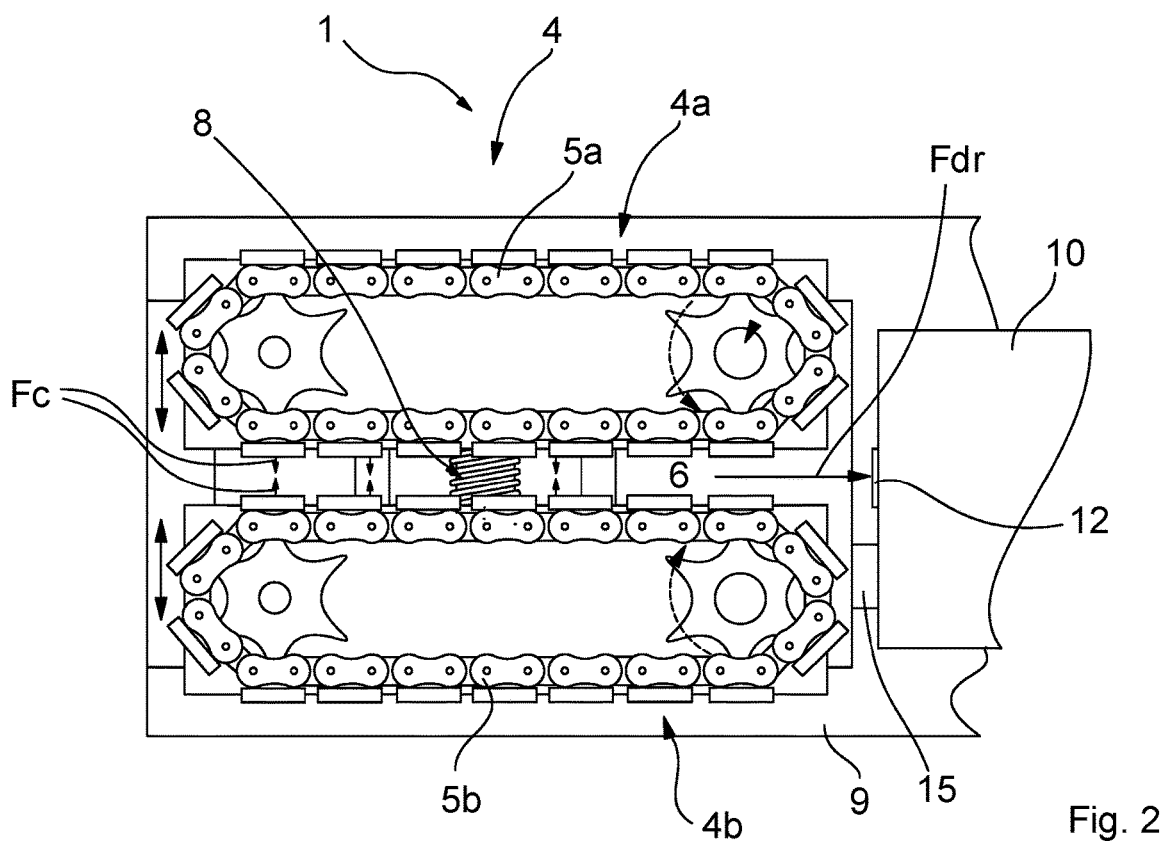
FIG. 2 is a top view of the apparatus of FIG. 1.

The figures show an apparatus 1 for installing an optical fiber cable 2 into a conduit 3. The apparatus 1 includes a conveyor 4 including a first part 4a with a first chain 5a and a corresponding second part 4b having a second chain 5b, where the first chain 5a and the second chain 5b encloses a cable guidance space 6. A pushing drive 7 drives both chains 5a, 5b at a driving speed which is induced to the cable 2 placed in the cable guidance space 6 and provide a driving force Fdr on the cable 2. The clamping force Fc with which the first part 4a and the second part 4b of the conveyor 4 is clamping the cable 2 between the chains 5a, 5b is controlled by a clamping force control 8. However, in other embodiments, the conveyor also provides a force to unwind the cable from a cable reel or cable drum, so that the driving force is a sum of the force needed to unwind the cable and the pushing force Fp.

The conveyor 4 is fixed to a frame part 9 of the apparatus 1. A blowing chamber house 10 is arranged displaceable, as indicated by the double arrow in FIG. 1, on the frame part 9 of the apparatus 1 and the conduit 3 into which the cable 2 is to be installed is connected to a cable outlet opening 11 of the blowing chamber house 10. The cable 2 is being guided from the conveyor arrangement 4 to a cable inlet opening 12 of the blowing chamber house 10 and from there to the cable outlet opening 11.

The blowing chamber house 10 is further equipped with a fluid inlet opening 13, which is connected to a source of pressurized fluid in the form of pressurized air (not shown) via a flow control valve 14. This is applied to create an airflow out through the conduit 3 to assist in carrying the cable 2 through the conduit 3 by inducing a drag force Fd on the cable 2. In alternative embodiments, other fluids such as water may be applied.

Figure 3:
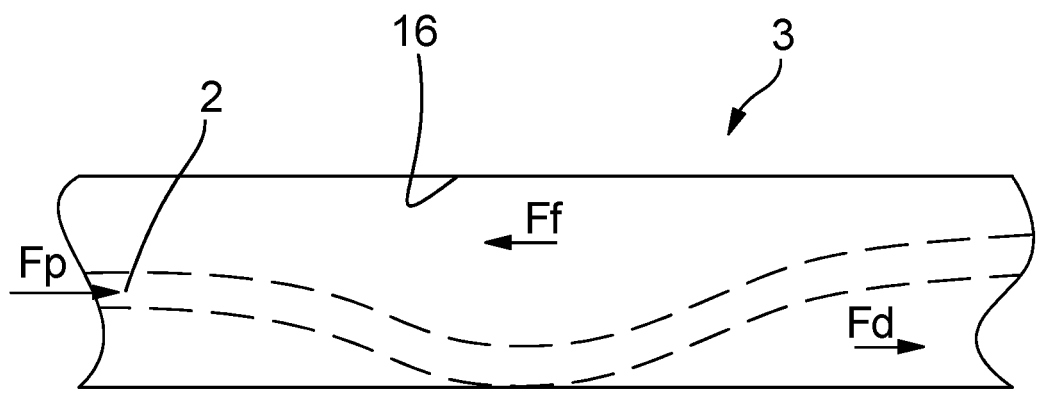
FIG. 3 is a sketch of the cable inside the conduit with indication of forces acting on the cable when the apparatus of FIG. 2 is used.

A force sensor 15 is provided between the conveyor 4 and the blowing chamber house 10 to provide a measure of the reaction force between the two, caused by the pushing force Fp on the cable 2 in the conduit 3 induced by the conveyor 4. In operation of the apparatus 1, the cable 2 in the conduit 3 is subject to the pushing force Fp from the conveyor 4, the drag force Fd from the fluid flow inside the conduit 3, and a friction force Ff from the friction between the inner wall 16 of the conduit 3 and the cable 2. The vector sum of these three forces Fp, Fd and Ff is substantially zero, as the cable 2 can be assumed not to accelerate substantially during operation of the apparatus 1. The magnitude of the pushing force Fp should be sufficient to overcome the difference between the drag force Fd acting in the same direction as the pushing force Fp, and the friction force Ff acting in a direction opposite of the two other forces Fp and Fd. In optimal operation of the apparatus 1, the direction of the pushing force Fp may actually be opposite to the drag force Fd, i.e., the conveyor 4 may slow the progress of the cable 2 into the conduit 3 as the magnitude of the drag force Fd from the fluid flow inside the conduit 3 exceeds the magnitude of the friction force Ff as the fluid flow will lift the cable 2 inside the conduit 3 and substantially avoid its contact with the inner wall 16 of the conduit 3. However, in less optimal operation of the apparatus 1, e.g., when the fluid flow rate is insufficient to lift the whole of the cable 2 from the inner wall 16 of the conduit 3 as illustrated in FIG. 3, the magnitude of the friction force Ff is larger and the direction of the pushing force Fp will be in the same direction as the drag force Fd.

The output from the force sensor 15 is considered to constitute a measure of the resistance to the cable 2 being installed into the conduit 3.

A flow measurement sensor 18 in the form of a Venturi tube sensor 18 is provided between the flow control valve 14 and the fluid inlet opening 13 of the blowing chamber house 10, which is arranged to measure the flow and provide a flow measurement output accordingly to the control 17, which is arranged to control the flow control valve 14 accordingly.

The force sensor 15 provides an output to control 17 of the apparatus, which is arranged to control the operation of the apparatus, including the flow control valve 14, which regulates the inflow of pressurized air into the blowing chamber house 10 and thus into the conduit 3 as well as the pushing drive 7 that determines the speed and/or pushing force Fp with which the conveyor 4 induces on the cable 2 situated in the guidance space 6. Furthermore, the control may control the clamping force control 8, which controls the force with which the first and the second part 4a, 4b of the conveyor 4 clamps the cable in the guidance space 6.

In operation of the apparatus 1, the control 17 controls the pushing drive 7 to operate at a driving speed setpoint value with which the conveyor 4 drives the cable 2 into the cable inlet opening 12 of the blowing chamber house 10 from which the cable 2 moves out through the cable outlet opening 11 and into the conduit 3, which is fixed to the cable outlet opening 11. The blowing chamber house 10 is fixed to a frame part 9 of the apparatus 1 and is as such immobile at the operation of the apparatus 1. The control 17 controls the flow control valve 14 to apply pressurized air to the blowing chamber house 10 via the fluid inlet opening 13, from which the flow of pressurized air is directed to the conduit 3. In the start-up of operating the apparatus 1 to install a cable 2 into the conduit 3, pressurized air at an initial flow rate setpoint is introduced into the conduit 3 when approximately the first 100 m of cable 2 has been installed into the conduit 3. As the cable 2 is driven further into the conduit 3, the friction force Ff between the cable 2 and the inner wall 16 of the conduit 3 will increase and so will the drag force Fd on the cable 2 from the fluid flowing in the conduit 3, both due to the longer length of the cable 2 being present inside the conduit 3. However, the friction force Ff will increase more than the drag force Fd, in particular in situations where the cable 2 undulates. This will result in an increase of the resistance to the cable 2 defined as the friction force Ff minus the drag force Fd, and the resistance will be counteracted by the pushing force Fp on the cable 2 from the conveyor 4 for keeping the speed of the cable 2 at the driving speed setpoint value.

As it is illustrated in FIG. 3, the cable 2 within the conduit 3 is subject to a pushing force Fp applied by the conveyor 4, a drag force Fd caused by the flow of pressurized air inside the conduit 3 and a friction force Ff from the contact between the inner wall 16 of the conduit 3 and the cable, which is moving at the driving speed from left to right in FIG. 3.

The force sensor 15 will detect the magnitude of the pushing force Fp and the control 17 will, provided that the output received from the force sensor 15 exceeds a first predetermined level for more the 5 seconds, increase the flow rate setpoint with an amount determined by the cross-sectional area of the conduit 3 minus the cross-sectional area of the cable 2. The increase in flow rate will increase the drag force Fd on the cable 2 in the conduit 3 and lower the resistance to the cable 2, which will lower the pushing force Fp on the cable 2 and thereby the output from the force sensor 15 to the control 17. This control cycle with increasing resistance measured by the force sensor 15 and the resulting increase of the flow rate setpoint will be repeated as the cable 2 is introduced further into the conduit 3 until the installation of the cable 2 is finalized or until the flow rate setpoint has reached a predefined maximum.

When the flow rate setpoint has reached the maximum value, the control 17 will, in case the output from the force sensor 15 exceeds the first predetermined level for more than 5 seconds, control the pushing drive 7 to reduce the driving speed setpoint value by a predetermined amount, such as 5 meters per minute. By reducing the driving speed of the cable 2, the friction force Ff between the cable 2 and the inner wall 16 of the conduit 3 is reduced and the output from the force sensor 15 will drop below the first predetermined level. This control cycle may also be repeated as the cable 2 is introduced further into the conduit 3.

In case the cable 2 fails to advance inside the conduit 3 and instead curls up inside the conduit 3 as it is advanced into the conduit 3 by the conveyor 4, the friction force Ff between the cable 2 and the inner wall 16 of the conduit 3 and thus the output from the force sensor 15 will rise quickly and provide a warning sign for the control 17. The control 17 is adapted to determine the rate of change of the output from the force sensor 15, i.e., the change of the output over time, and if that rate of change exceeds a given threshold value, the control 17 will control the pushing drive 7 to reduce the driving speed induced onto the cable 2 to a fraction of the current driving speed setpoint value, such as to 25% of the driving speed setpoint value. Thereby, the drag force Fd from the fluid flow inside the conduit 3 on the cable 2 present in the conduit 3 is allowed to straighten out the cable 2 and remove the curls of the cable 2 in the conduit 3 while the cable 2 is still advanced into the conduit 3 at a low driving speed. It has shown to be a more efficient method of resolving the problem of curling of the cable 2 within the conduit 3 than halting the advancement of the cable 2 completely, as the resumption of the feeding of the cable 2 into the conduit 3 with the current driving speed setpoint value will be more successful.

Alternatively to determine the rate of change of the output from the force sensor 15, the control 17 may be adapted to detect that the output from the force sensor 15 exceeds a second predetermined level and reduce the driving speed induced on the cable 2 by the conveyor 4 to a fraction of the current driving speed setpoint value, such as 25% thereof.

In both cases, the control 17 will determine when the output from the force sensor 15 drops below the first predetermined level for at least 5 seconds, where after the advancement of the cable 2 by the conveyor 4 at the current driving speed setpoint value is resumed.

Should the output from the force sensor 15 fail to drop below the first predetermined level after 60 seconds of the reduced driving speed of the cable 2, the control 17 may control the pushing drive 7 to halt the driving of the cable 2 and reverse the driving direction of the conveyor 4 for, e.g., 5 or 10 meters in order to straighten out curls of the cable 2 within the conduit 3, where after the advancement of the cable 2 by the conveyor 4 at the current driving speed setpoint value is resumed.

REFERENCE NUMBERS

1 Apparatus
2 Optical fibre cable
3 Conduit
4 Conveyor arrangement
4a First part of conveyor
4b Second part of conveyor
5a First chain
5b Second chain
6 Guidance space
7 Pushing drive unit
8 Clamping force control
9 Frame part of the apparatus
10 Blowing chamber house
11 Cable outlet opening
12 Cable inlet opening
13 Fluid inlet opening
14 Flow control valve 15 Force sensor
16 Inner wall of the conduit
17 Control means
18 Flow measurement sensor
Fdr Driving force
Fp Pushing force
Fc Clamping force
Fd Drag force
Ff Friction force Aspects of the Present Invention are Defined in the Following Items:

1. Apparatus (1) for installing a cable (2), such as an optical fibre cable (2), into a conduit (3), with the assistance of a fluid drag, such as by means of a gas, on the cable (2) within the conduit (3), the apparatus comprising:
   a blowing chamber house (10) comprising a cable inlet opening (12) and a cable outlet opening (11) and a fluid inlet opening (13) for receiving a supply of pressurized fluid, wherein the cable outlet opening (11) is configured to be connected to the conduit (3) and allow supplied pressurized fluid to flow into the conduit (3),
   a fluid flow control unit (14) for controlling flow of pressurized fluid to the fluid inlet opening (13) of the blowing chamber house (10),
   a pushing drive unit (7),
   a conveyor arrangement (4) comprising a first conveyer part (4a) and a second conveyer part (4b), wherein said conveyer parts (4a, 4b) are arranged at opposing sides of a cable guidance space (6) and wherein one or both conveyer parts (4a, 4b) are configured to be driven by the pushing drive unit (7) of the apparatus and thereby induce a driving force (Fdr) and a driving speed onto a part of the cable (2) arranged in the cable guidance space (6),
   a force sensor (15) arranged to measure a force between the blowing chamber house (10) and the conveyor arrangement (4) and provide a sensor output accordingly, and
   control means (17) for controlling the operation of the apparatus in accordance with the sensor output provided by the force sensor (15),
   wherein the conveyor arrangement (4) and the blowing chamber house (10) are arranged to be mutually displaceable.

2. Apparatus according to item 1, wherein the blowing chamber house (10) is displaceably arranged and the conveyor arrangement (4) is fixed to a frame part (9) of the apparatus (1), and the force sensor (15) is positioned to measure the force between the blowing chamber house (10) and the conveyor arrangement (4) or the frame part (9) of the apparatus (1).

3. Apparatus according to item 1 or 2, wherein the control means (17) are arranged to control the fluid flow control unit (14) in response to the sensor output provided by the force sensor (15) and/or to control the pushing drive unit (7) in response to the sensor output provided by the force sensor (15).

4. Apparatus according to any of items 1 to 3, further comprising a flow measurement sensor (18) arranged to measure the flow of said pressurized fluid into the blowing chamber house (10) and providing a flow measurement output accordingly to the control means (17), and wherein the control means (17) are arranged to control the fluid flow control unit in (14) response to said flow measurement output.

5. Apparatus according to item 3 or 4, wherein the control means (17) are arranged to control the fluid flow control unit (14) to increase the flow of pressurized fluid into the blowing chamber house (10) in response to an increase in the force between the blowing chamber house (10) and the conveyor arrangement (4) determined from the sensor output provided by the force sensor (15).

6. Apparatus according to item 5, wherein the control means (17) are arranged to control the fluid flow control unit (14) to increase the flow of pressurized fluid into the blowing chamber house (10) in case the force between the blowing chamber house (10) and the conveyor arrangement (4) determined from the sensor output provided by the force sensor (15) exceeds a determined value.

7. Apparatus according to any of the preceding items, wherein the control means (17) are arranged to control the pushing drive unit (6) in response to the sensor output provided by the force sensor (15) to reduce the driving speed induced onto the cable (2) in response to an increase in the force between the blowing chamber house (10) and the conveyor arrangement (4).

8. Apparatus according to item 7, wherein the control means (17) are arranged to reduce the driving speed induced onto the cable (2) with 50% to 90%, such as with 65% to 80% of the driving speed, in response to the output from the force sensor (15).

9. Apparatus according to item 8, wherein the control means (17) are arranged to make said reduction when the output from the force sensor (15) exceeds a threshold value.

10. Apparatus according to item 8, wherein the control means (17) are arranged to make said reduction when a rate of change of the output from the force sensor (15) exceeds a threshold value.

11. Apparatus according to any of the preceding items, wherein the control means (17) are arranged to control the pushing drive unit (7) to terminate the driving of the cable (2) by means of the conveyor arrangement (4) in response to the sensor output provided by the force sensor (15) indicating an increase in the force between the blowing chamber house (10) and the conveyor arrangement (4).

12. Apparatus according to any of the preceding items, wherein the control means (17) are arranged to control the pushing drive unit (7) to reverse the driving speed of the cable (2) by means of the conveyor arrangement (4) in response to the sensor output provided by the force sensor (15) indicating an increase in the force between the blowing chamber house (10) and the conveyor arrangement (4).

The invention claimed is:

1. An apparatus for installing a cable into a conduit with the assistance of a fluid drag on the cable within the conduit, the apparatus comprising:
   a blowing chamber house having a cable inlet opening, a cable outlet opening, and a fluid inlet opening for receiving a supply of pressurized fluid, wherein the cable outlet opening is configured to be connected to the conduit and allow supplied pressurized fluid to flow into the conduit;
   a fluid flow control controlling flow of pressurized fluid to the fluid inlet opening of the blowing chamber house;
   a pushing drive;
   a conveyor comprising:
      a first conveyer part; and
      a second conveyer part, wherein the first conveyer part and the second conveyer part are arranged at opposing sides of a cable guidance space and wherein one or both of the first conveyer part and the second conveyer part are driven by the pushing drive and thereby induce a driving force (Fdr) and a driving speed onto a part of the cable arranged in the cable guidance space; and a control is arranged to determine a measure of resistance to the cable being installed into the conduit by the conveyor and for controlling operation of the apparatus in accordance with the determined measure of resistance;

wherein the control is arranged to control the fluid flow control in response to the determined measure of resistance or to control the pushing drive in response to the determined measure of resistance; and wherein the control is arranged to control the fluid flow control to increase the flow of pressurized fluid into the blowing chamber house in response to an increase in the determined measure of resistance.

2. The apparatus according to claim 1, wherein the conveyor and the blowing chamber house are arranged to be mutually displaceable, and wherein the apparatus further comprises a force sensor arranged to measure a force between the blowing chamber house and the conveyor and provide a sensor output accordingly to the control, which is arranged to apply the sensor output to determine the measure of resistance to the cable being installed into the conduit by the conveyor.

3. The apparatus according to claim 2, wherein the blowing chamber house is displaceably arranged and the conveyor is fixed to a frame part of the apparatus, and the force sensor is positioned to measure the force between the blowing chamber house and the conveyor or a force between the blowing chamber house and the frame part of the apparatus.

4. The apparatus according to claim 1, further comprising a flow measurement sensor arranged to measure the flow of the pressurized fluid into the blowing chamber house and providing a flow measurement output accordingly to the control, and wherein the control is arranged to control the fluid flow control in response to the flow measurement output.

5. The apparatus according to claim 1, wherein the control is arranged to control the fluid flow control to increase the flow of pressurized fluid into the blowing chamber in case the determined measure of resistance exceeds a determined value.

6. The apparatus according to claim 1, wherein the control is arranged to control the pushing drive in response to the determined measure of resistance to reduce the driving speed induced onto the cable in response to an increase in the determined measurement of resistance.

7. The apparatus according to claim 6, wherein the control is arranged to reduce the driving speed induced onto the cable with 50% to 90% of a current driving speed of the cable in response to the determined measurement of resistance.

8. The apparatus according to claim 7, wherein the control is arranged to reduce the driving induced onto the cable when the determined measurement of resistance exceeds a threshold value.

9. The apparatus according to claim 7, wherein the control is arranged to reduce the driving onto the cable when a rate of change of the determined measurement of resistance exceeds a threshold value.

10. The apparatus according to claim 1, wherein the control is arranged to control the pushing drive to terminate the driving of the cable by the conveyor in response to the determined measurement of resistance indicating an increase in the resistance to the cable being installed into the conduit by the conveyor.

11. The apparatus according to claim 1, wherein the control is arranged to control the pushing drive to reverse a driving direction of the cable by the conveyor in response to the determined measurement of resistance indicating an increase in the resistance to the cable being installed into the conduit by the conveyor.

12. An apparatus for installing a cable into a conduit with the assistance of a fluid drag on the cable within the conduit, the apparatus comprising:

a blowing chamber house having a cable inlet opening, a cable outlet opening, and a fluid inlet opening for receiving a supply of pressurized fluid, wherein the cable outlet opening is configured to be connected to the conduit and allow supplied pressurized fluid to flow into the conduit;

a fluid flow control for controlling flow of pressurized fluid to the fluid inlet opening of the blowing chamber house;

a pushing drive;

a conveyor comprising:
 a first conveyer part; and
 a second conveyer part, wherein the first conveyer part and the second conveyer part are arranged at opposing sides of a cable guidance space and wherein one or both of the first conveyer part and the second conveyer part are driven by the pushing drive and thereby induce a driving force (Fdr) and a driving speed onto a part of the cable arranged in the cable guidance space; and a control for controlling operation of the apparatus, wherein the control is arranged to determine a measure of resistance to the cable being installed into the conduit by the conveyor;

wherein the control is arranged to control the pushing drive to reduce the driving speed induced onto the cable with 50% to 90% of a current driving speed of the cable in response to the determined measure of resistance.

13. The apparatus according to claim 12, wherein the control is arranged to reduce the driving speed induced onto the cable when the determined measure of resistance exceeds a threshold value.

14. The apparatus according to claim 12, wherein the control is arranged to reduce the driving speed induced onto the cable when a rate of change of the determined measure of resistance exceeds a threshold value.

15. An apparatus for installing a cable into a conduit with the assistance of a fluid drag on the cable within the conduit, the apparatus comprising:

a blowing chamber house having a cable inlet opening, a cable outlet opening, and a fluid inlet opening for receiving a supply of pressurized fluid, wherein the cable outlet opening is configured to be connected to the conduit and allow supplied pressurized fluid to flow into the conduit;

a fluid flow control controlling flow of pressurized fluid to the fluid inlet opening of the blowing chamber house;

a pushing drive;

a conveyor comprising:
 a first conveyer part; and
 a second conveyer part, wherein the first conveyer part and the second conveyer part are arranged at opposing sides of a cable guidance space and wherein one or both of the first conveyer part and the second conveyer part are driven by the pushing drive and thereby induce a driving force (Fdr) and a driving speed onto a part of the cable arranged in the cable guidance space; and a control is arranged to determine a measure of resistance to the cable being installed into the conduit by the conveyor and for controlling operation of the apparatus in accordance with the determined measure of resistance;

wherein the control is arranged to control the fluid flow control in response to the determined measure of resistance and to control the pushing drive in response to the determined measure of resistance; and wherein the control is arranged to control the fluid flow control to increase the flow of pressurized fluid into the blowing chamber house in response to an increase in the determined measure of resistance.

* * * * *